United States Patent
Raju

(10) Patent No.: US 12,107,457 B2
(45) Date of Patent: Oct. 1, 2024

(54) SYSTEM TO PROVIDE AC OR DC POWER TO ELECTRONIC EQUIPMENT

(71) Applicant: Ravisekhar Nadimpalli Raju, Clifton Park, NY (US)

(72) Inventor: Ravisekhar Nadimpalli Raju, Clifton Park, NY (US)

( * ) Notice: Subject to any disclaimer, the term of this patent is extended or adjusted under 35 U.S.C. 154(b) by 182 days.

(21) Appl. No.: 17/685,330

(22) Filed: Mar. 2, 2022

(65) Prior Publication Data

US 2022/0190638 A1    Jun. 16, 2022

Related U.S. Application Data

(63) Continuation-in-part of application No. PCT/US2020/049058, filed on Sep. 2, 2020.

(60) Provisional application No. 62/894,863, filed on Sep. 2, 2019.

(51) Int. Cl.
    *H02J 9/06*     (2006.01)
    *H02M 3/156*    (2006.01)
    *H02M 7/537*    (2006.01)

(52) U.S. Cl.
    CPC .............. *H02J 9/068* (2020.01); *H02J 9/061* (2013.01); *H02J 9/062* (2013.01); *H02M 3/156* (2013.01); *H02M 7/537* (2013.01)

(58) Field of Classification Search
    CPC .. H02J 9/068; H02J 9/061; H02J 9/062; H02J 9/06; H02M 3/156; H02M 7/537; H02M 1/10
    See application file for complete search history.

(56) References Cited

U.S. PATENT DOCUMENTS

| | | | | |
|---|---|---|---|---|
| 4,104,687 A | * | 8/1978 | Zulaski | H02H 3/36 361/88 |
| 4,860,185 A | * | 8/1989 | Brewer | G06F 1/28 307/66 |
| 9,203,323 B2 | * | 12/2015 | West | H02M 5/4585 |
| 2002/0122322 A1 | * | 9/2002 | Oughon, Jr. | H02M 1/10 363/37 |
| 2004/0066094 A1 | * | 4/2004 | Suzuki | H02J 3/38 307/18 |
| 2005/0040785 A1 | * | 2/2005 | Barnes | G06F 1/263 320/101 |
| 2007/0253135 A1 | * | 11/2007 | Bovitz | H02M 1/10 361/118 |
| 2009/0184583 A1 | * | 7/2009 | Lu | H02J 9/062 307/66 |
| 2009/0278568 A1 | * | 11/2009 | Lavery | H03K 19/00361 326/82 |
| 2011/0215648 A1 | * | 9/2011 | Yamada | H02J 3/1814 307/66 |

(Continued)

*Primary Examiner* — Daniel Kessie
*Assistant Examiner* — Brian K Baxter

(57) ABSTRACT

A system and method is provided to provide power to a load or electronic equipment which includes a multi-pole switch that connects the input of the load or electronic equipment to a first AC source or a DC source or an optional second AC source created from the DC source through a DC-AC converter. The connection to the DC source is either direct or through a DC-DC converter that provides voltage adjustment or isolation. A controller changes the position of the switch in response to the sensing of the presence and magnitude of the sources or in response to an external command to select a preferred source.

6 Claims, 10 Drawing Sheets

(56) References Cited

U.S. PATENT DOCUMENTS

| | | | |
|---|---|---|---|
| 2012/0025609 A1* | 2/2012 | West | H02J 9/062 307/31 |
| 2014/0036545 A1* | 2/2014 | Reddy | H02M 3/33507 363/17 |
| 2014/0346877 A1* | 11/2014 | Fujita | H02J 9/062 307/45 |
| 2015/0146326 A1* | 5/2015 | Cao | H02H 11/00 361/2 |
| 2015/0380968 A1* | 12/2015 | Lee | G06F 1/30 713/300 |
| 2016/0020443 A1* | 1/2016 | White | B25F 5/00 318/245 |
| 2017/0264186 A1* | 9/2017 | Shimura | H02M 1/32 |
| 2018/0287408 A1* | 10/2018 | Kutkut | H02J 9/062 |
| 2020/0244187 A1* | 7/2020 | Shirasawa | H02M 3/33571 |
| 2020/0260608 A1* | 8/2020 | Thibaut | H05K 7/1489 |
| 2020/0328693 A1* | 10/2020 | Fujii | H02P 23/06 |
| 2021/0384831 A1* | 12/2021 | Diaz De Leon Miranda | H02M 1/32 |
| 2023/0128586 A1* | 4/2023 | Graninger | H03K 17/10 327/367 |
| 2023/0253877 A1* | 8/2023 | Liu | H02M 1/4258 363/16 |
| 2023/0283101 A1* | 9/2023 | Al Dubaikel | H02J 9/068 307/64 |

* cited by examiner

SYSTEM TO PROVIDE AC OR DC POWER TO ELECTRONIC EQUIPMENT

CROSS-REFERENCE TO RELATED APPLICATION

This application claims the benefit of and is a continuation-in-part continuation of U.S. Provisional Patent Application No. 62/894,863, filed 2 Sep. 2019, and International Application No. PCT/US20/49058, filed 2 Sep. 2020, which are incorporated by reference herein in entirety.

STATEMENT OF GOVERNMENT INTEREST

Portions of this invention were made with government support under DE-EE0006521 awarded by the Office of Energy Efficiency and Renewable Energy, U.S. Department of Energy. The government has certain rights in the invention.

FIELD OF THE INVENTION

The present invention relates to the field of electrical power supplies and uninterruptible power supplies. Specifically, the present invention relates to a system to supply power to electronic equipment.

BACKGROUND

Electronic equipment such as laptop computers, modems and routers are often supplied through a switch-mode adapter that rectifies the input AC and converts it to a regulated DC which is fed to the equipment. Some other electronic equipment such as desktop computers, television sets and LED bulbs typically include rectifiers in their internal power supplies that convert the input AC to DC. Typically uninterruptible power supplies use inverters to create AC from a battery DC source and feed this AC to loads such as electronic equipment in case of an outage of the main AC supply. Disadvantages of this include the power losses and cost of the inverter. Some uninterruptible supplies tap into the DC bus downstream of the power adapter or rectifier in the electronic equipment and feed DC power from a source such as a battery to this DC bus in case of an outage of the main AC supply. Disadvantages of this include the need to access the DC bus. Therefore, what is needed are techniques that overcome the above mentioned disadvantages.

BRIEF SUMMARY OF THE INVENTION

Embodiments of the invention provide a system to supply AC or DC power to an electronic equipment.

In accordance with one aspect of the invention, an electronic equipment with a rectifier stage in its power supply comprises two input terminals, and is fed either from an AC source or a DC source. One of the input terminals is tied directly to a terminal (for instance the neutral) of the AC source terminal as well as a terminal of the DC source (for instance the negative). The other input terminal of the equipment is connected to a double-throw switch that is controlled to connect the equipment directly either to a second terminal (for instance the live terminal) of the AC source or to a second terminal (for instance the positive) of the DC source. The rectifier processes the AC or DC input and provides a DC output for the load.

According to another aspect of the invention, the aforementioned switch is used to connect the equipment either to an AC supply directly or to the DC supply through a DC-DC converter.

According to yet another aspect of the invention, the aforementioned switch is used to selectively connect the electronic equipment either to an AC supply or to a DC supply based on sensing of the presence and magnitude of the AC or DC supply voltages.

According to yet another aspect of the invention, the aforementioned switch comprises of a relay with a control coil energized from an AC supply thereby connecting the electronic equipment to the AC supply when it is present and connecting the electronic equipment to a DC supply when the AC supply is absent.

According to yet another aspect of the invention, the aforementioned switch consists of a relay with a control coil energized from a DC supply thereby connecting the electronic equipment to the DC supply when it is present and connecting the electronic equipment to an AC supply when the DC supply is absent.

According to yet another aspect of the invention, the aforementioned DC supply consists of a DC energy storage component that is replenished through an AC-DC charger connected to the AC supply or a DC-DC charger connected to a DC source.

According to other embodiments of the invention, an electronic equipment is connected through a triple-throw switch that connects an input terminal of the electronic equipment selectively to a first AC input or to a DC input or to a second AC input wherein the second AC input is generated from the DC input through a DC-AC converter and the DC input is optionally processed through a DC-DC converter to provide voltage adjustment, galvanic isolation or protection.

According to yet another aspect of the invention, the aforementioned DC supply consists of a DC energy storage component that is replenished through an AC-DC charger connected to the AC supply or a DC-DC charger connected to a DC source.

According to other embodiments of the invention, an electronic equipment has two input terminals which are fed either from an AC source or from a converter that is fed by a DC source. The converter is capable of DC-DC or DC-AC conversion. When the converter initially feeds the equipment it provides DC and senses the current drawn by the equipment. If the current sensed indicates an overcurrent due to saturation of components such as magnetics or motors in the fed equipment, the converter transitions to providing an AC output to the equipment.

According to other embodiments of the invention, the aforementioned switch mentioned in the previous embodiments comprises one or more semiconductor devices instead of an electro-mechanical device or is a combination of semiconductor and electro-mechanical devices.

Various other features and advantages will be made apparent from the following detailed description and the drawings.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention.

Figure 1:
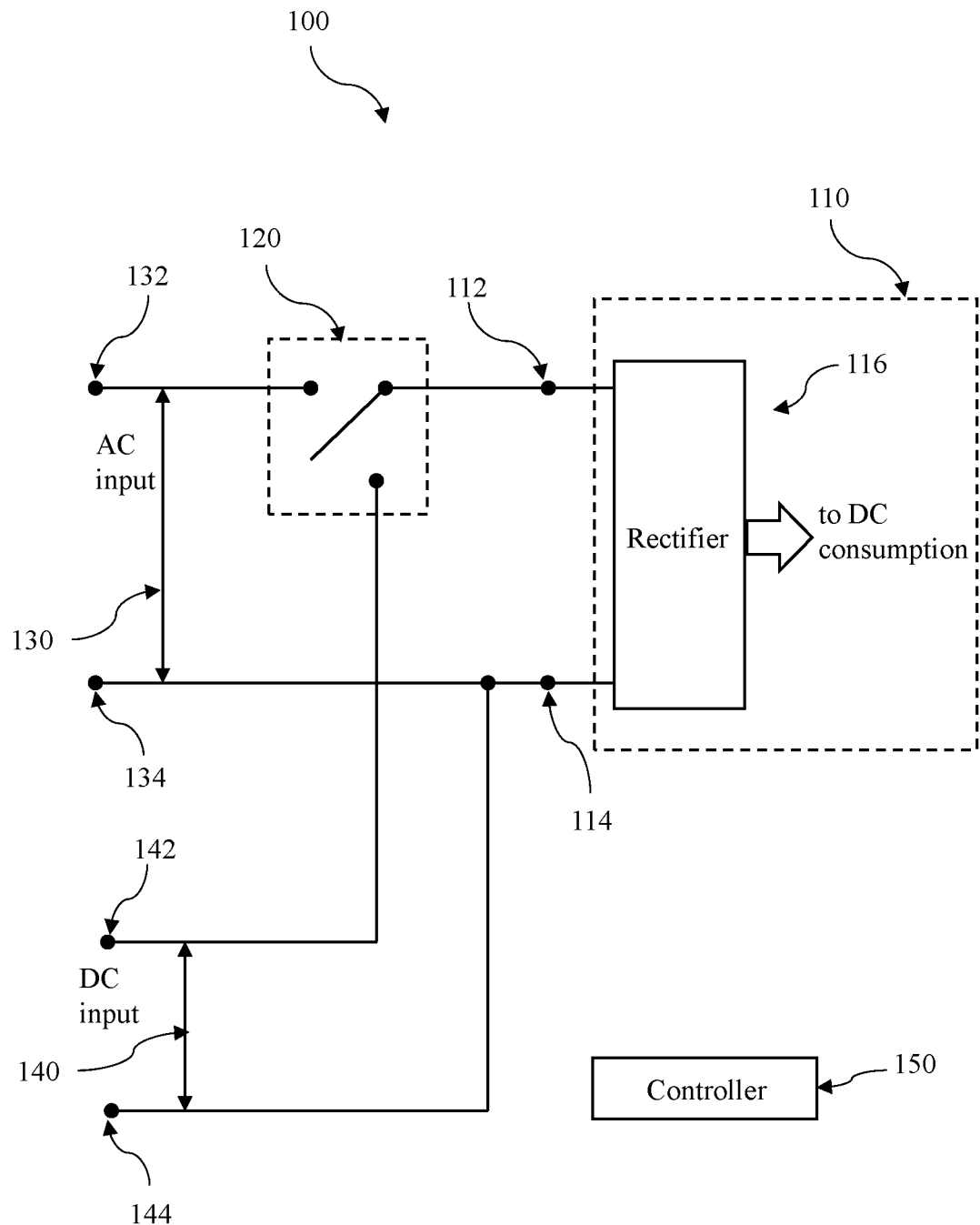
FIG. 1 illustrates a system to provide power to an electronic equipment with a rectifier stage in its power supply section, an AC supply and a DC supply. One terminal of the equipment is directly tied to one terminal of the AC supply as well as one terminal of the DC supply while a switch at the other terminal of the equipment establishes connection to either the other AC input terminal or the other DC input terminal to feed AC or DC power to the equipment, according to one embodiment of the present invention.

FIG. 1 illustrates a system 100, comprising an electronic equipment 110, a double-throw switch 120, an AC supply 130, and a DC supply 140, according to one embodiment of the present invention. The electronic equipment has a power supply rectifier, 116, that feeds DC to the loads of the equipment 110. Terminal 114 of the equipment, 110, is directly connected to a terminal 134 of the AC input, 130 and a terminal 144 of the DC input, 140. Terminal 134 can, for example, be the neutral of the AC input and terminal 144 can, for example, be the negative of the DC input. A second terminal, 112, of the equipment, 110, is connected to a switch, 120, which connects terminal 112 either to terminal 132 of the AC supply or to terminal 142 of the DC supply. An optional controller, 150, senses, for example, the source voltages and places the switch in an appropriate state, for example, connecting the equipment to the DC supply if the AC supply voltage falls below a threshold level.

Figure 2:
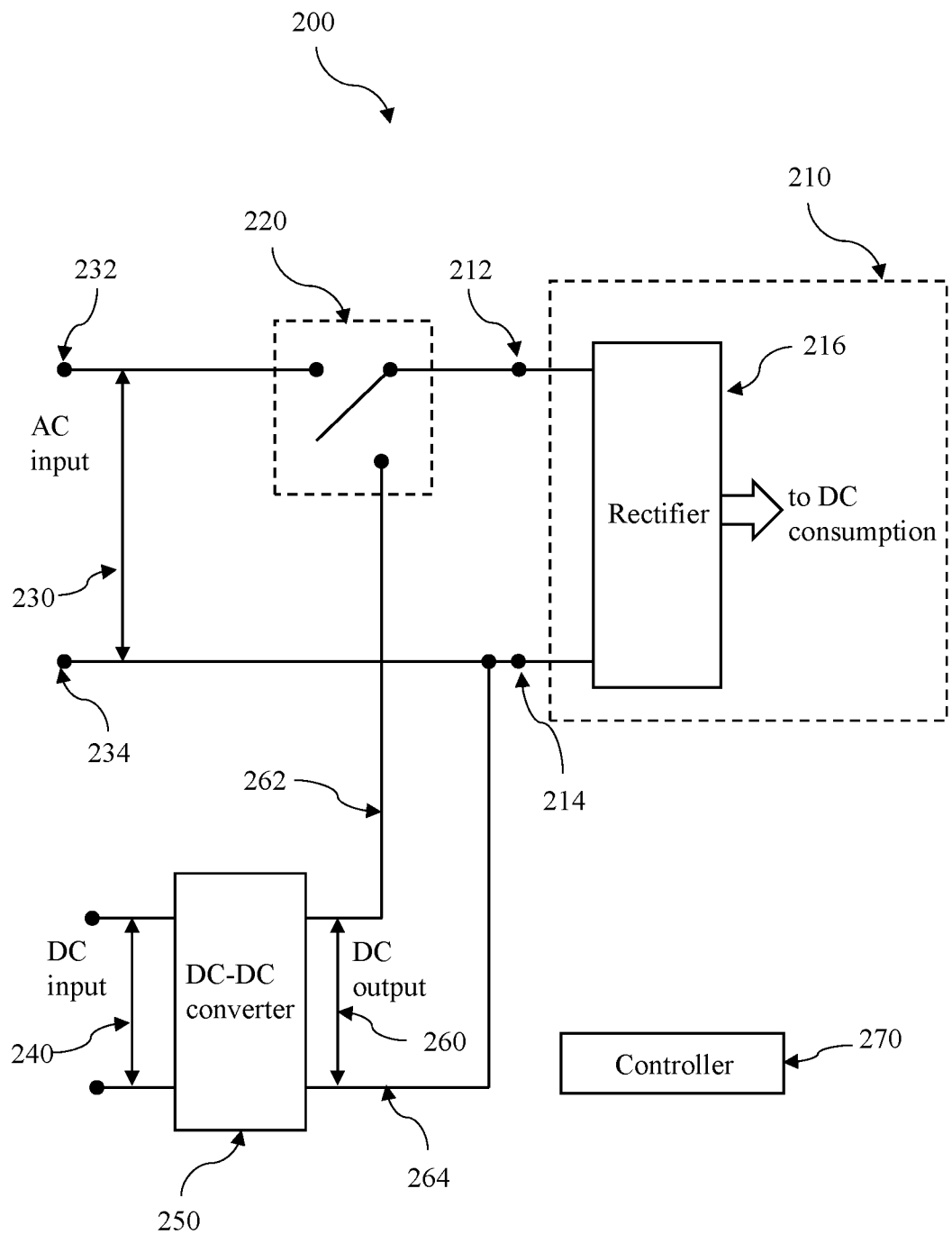
FIG. 2 illustrates a system to provide power to an electronic equipment with a rectifier; wherein a switch directly connects the equipment to an AC input or to a DC voltage derived through a DC-DC converter from a DC input, according to one embodiment of the present invention.

FIG. 2 illustrates, according to one embodiment of the present invention, a system 200, comprising an electronic equipment 210, a switch 220, an AC supply 230, a DC supply 240 and a DC-DC converter, 250, which converts the DC input to a DC output 260. The electronic equipment has a power supply rectifier, 216, that feeds DC to the electronic loads. The switch, 220, selectively connects an input terminal, 212, of the equipment, 210, to a terminal, 232, of the AC supply or to a terminal, 262, at the DC-DC converter output. A second terminal, 214, of the equipment, 210, is directly connected to a terminal 234 of the AC input, 230 and a terminal 264 of the DC-DC converter output, 260. An optional controller, 270, senses the AC and DC inputs and controls the switch, for instance, connecting the equipment to the DC-DC converter if the AC input voltage is absent or too low for proper functioning of equipment 210. In addition, controller 270 optionally activates or deactivates the DC-DC converter, 250, for example, to reduce power losses by turning it off when switch 220 is connected to the AC input. As another application example, the controller connects the switch to the DC feed if a DC input such as a photovoltaic source is available with adequate power so that power draw from the AC supply can be avoided.

Figure 3:
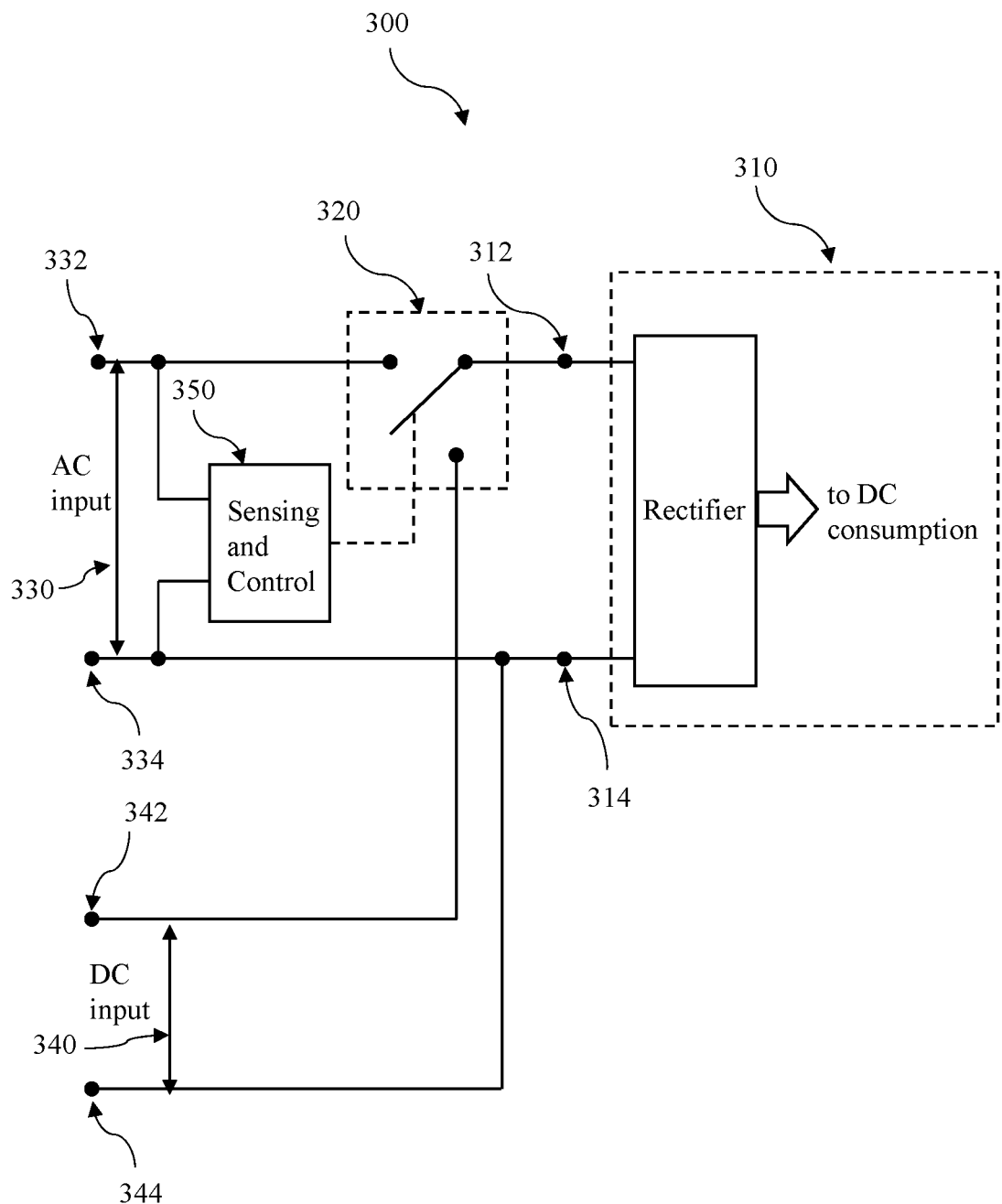
FIG. 3 illustrates a system to provide power to an electronic equipment with a rectifier; wherein a switch directly connects the equipment to an AC input or DC input to feed AC or DC power to the equipment, and wherein the switch is controlled by a sensing and control component that senses the AC input, according to one embodiment of the present invention.

FIG. 3 illustrates, according to one embodiment of the present invention, a system 300, comprising an electronic equipment 310, a switch 320, an AC supply 330, and a DC supply 340. The electronic equipment has a power supply rectifier that feeds DC to the loads. One terminal, 312, of the equipment, 310, is connected to a switch, 320, which connects terminal 312 either to terminal 332 of the AC supply or to terminal 342 of the DC supply. A second terminal, 314, of the equipment, 310, is tied directly to a terminal 334 of the AC supply as well as to a terminal 344 of the DC supply. A sensing and control component, 350, senses the AC source voltage and places the switch in an appropriate state, e.g., connecting the equipment to the AC supply if the AC supply voltage is above a threshold level or connecting the equipment to the DC supply otherwise.

Figure 4:
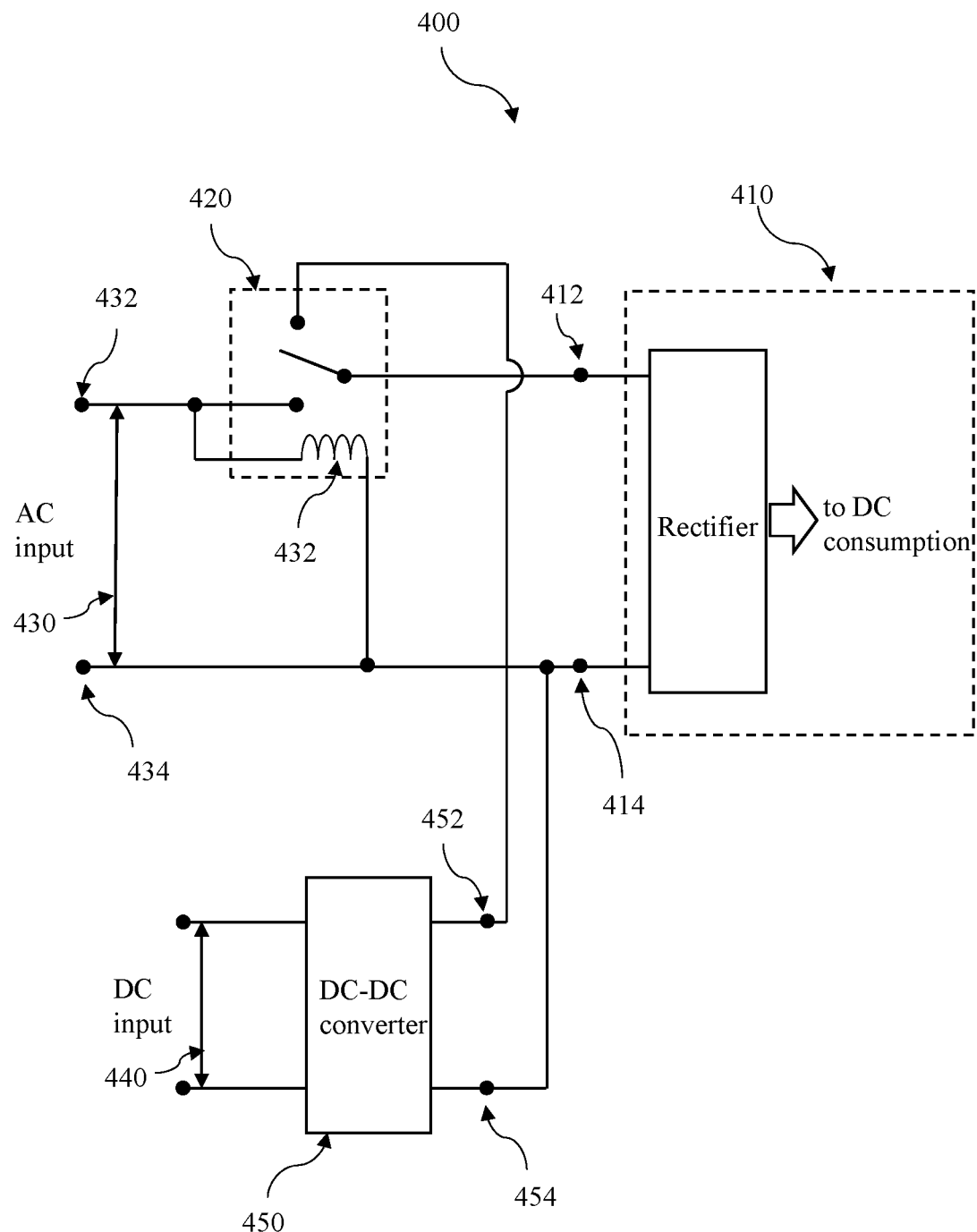
FIG. 4 shows a system to provide power to an electronic equipment with a rectifier in its power supply section; wherein a switching relay connects the equipment to an AC input when activated by a relay coil energized from the AC input; and wherein the switching relay connects the equipment to a DC voltage from a DC input or DC-DC converter when the relay coil is de-energized due to absence of adequate AC input, according to one embodiment of the present invention.

FIG. 4 illustrates, according to one embodiment of the present invention, a system 400, comprising an electronic equipment 410, a switching relay 420, an AC supply 430, a DC supply 440, and a DC-DC converter 450. The electronic equipment has a rectifier that feeds DC for consumption by its components. A terminal, 412, of the equipment, 410, is connected to the switching relay, 420, which connects terminal 412 either to terminal 432 of the AC supply or to terminal 452 at the DC-DC converter output. A second terminal, 414, of the equipment, 410, is tied directly to a terminal 434 of the AC supply as well as to a terminal 454 of the DC supply. The switching relay has a coil 432 which is energized from the AC input source. If the AC input has a sufficient voltage, the relay coil stays energized and switch 420 connects the equipment 410 to the AC input 430. If the AC input drops below a threshold voltage, the relay coil gets de-energized and switch 420 connects equipment 410 to the output of the DC-DC converter 450. The optional DC-DC converter is used to step-up or step-down the DC input voltage to a level that is suitable to feed the equipment 410. As an example, the DC input can be stepped up from a 5-volt or 9-volt level to 150 volts DC to feed the equipment 410. In addition, the DC-DC converter can provide galvanic isolation and protection for the DC source or load in case of fault conditions.

Figure 5:
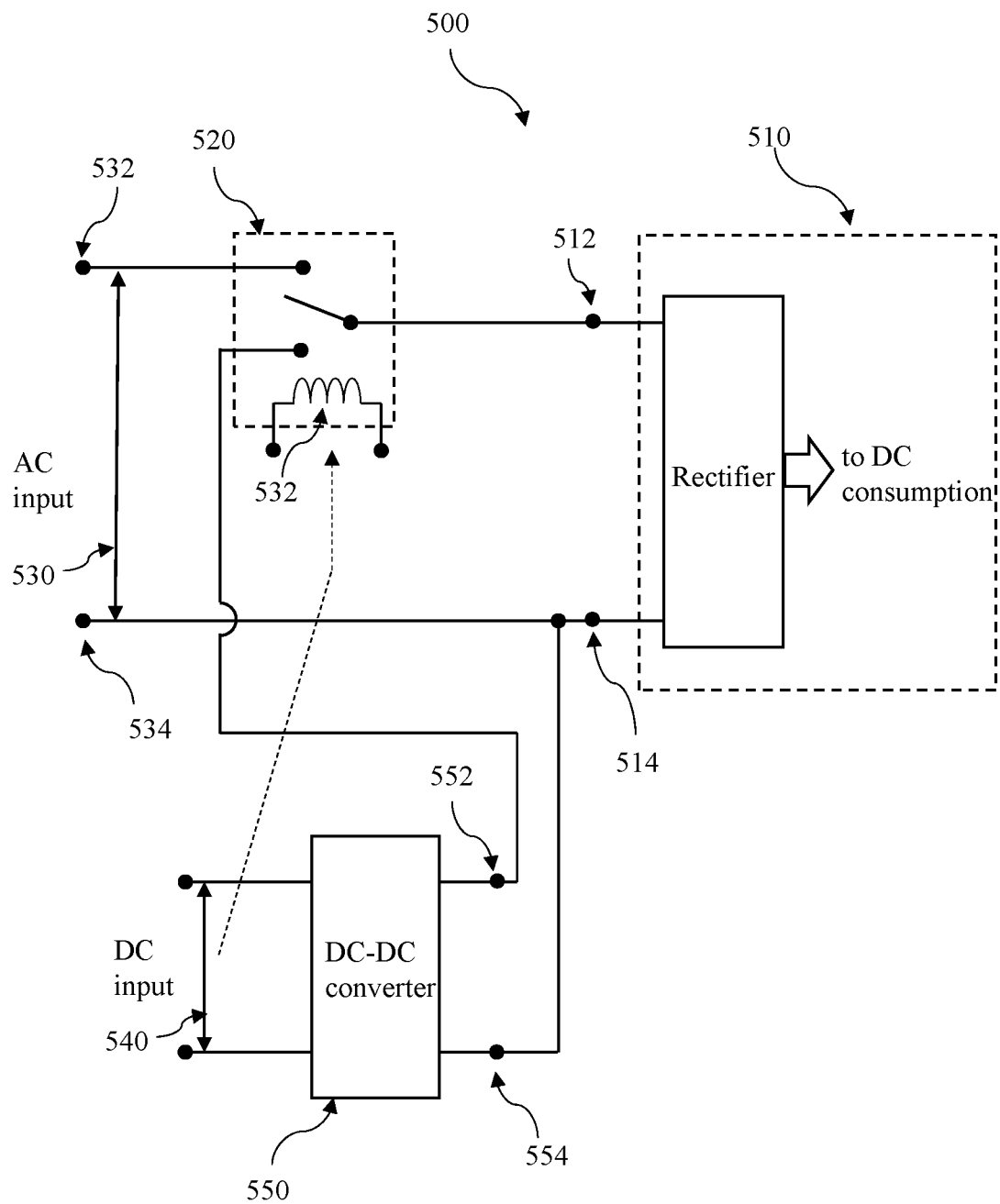
FIG. 5 shows a system to provide power to an electronic equipment with a rectifier in its power supply section; wherein a switching relay connects the equipment to a DC input when activated by a relay coil energized from the DC input; and wherein the switching relay connects the equipment to a AC voltage when the relay coil is de-energized due to absence of adequate DC input, according to one embodiment of the present invention.

FIG. 5 illustrates, according to one embodiment of the present invention, a system 500, comprising an electronic equipment 510, a switching relay 520, an AC supply 530, a DC supply 540, and a DC-DC converter 550. The electronic equipment has a rectifier stage in its power supply that feeds DC internally. A terminal, 512, of the equipment, 510, is connected to the switching relay, 520, which connects terminal 512 either to terminal 532 of the AC supply or to terminal 552 at the DC-DC converter output. A second terminal, 514, of the equipment, 510, is tied directly to a terminal 534 of the AC supply as well as to a terminal 554 of the DC supply. The switching relay, 520, has a coil 532 which is energized from the AC input source. If the AC input has a sufficient voltage, the relay coil stays energized and switch 520 connects the equipment 510 to the AC input 530. If the AC input drops below a threshold voltage, the relay coil gets de-energized and switch 520 connects equipment 510 to the output of the DC-DC converter 550. The optional DC-DC converter is used to step-up or step-down the DC input voltage to a level that is suitable to feed the equipment 510. As an example, the DC input can be stepped up from a 5-volt or 9-volt level to 150 volts DC to feed the equipment 510. In addition, the DC-DC converter can provide galvanic isolation and protection for the DC source or load in case of fault conditions.

Figure 6:
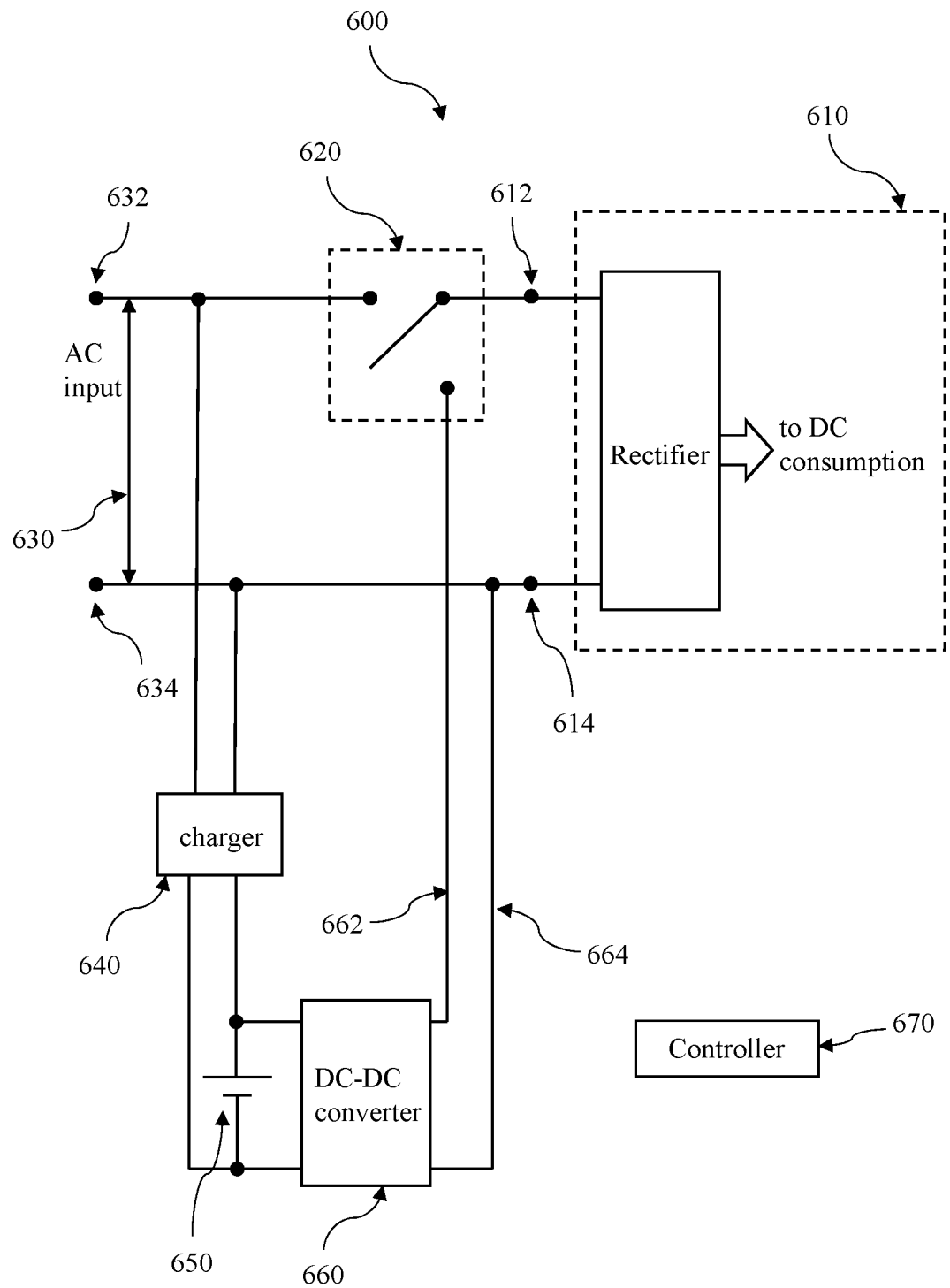
FIG. 6 illustrates a system to provide power to an electronic equipment with a rectifier in its power supply section, according to one embodiment of the present invention; wherein a switch connects an input terminal of the electronic equipment selectively to an AC input voltage or to a DC voltage; and wherein the DC voltage is produced by a DC-DC converter supplied by a DC source or DC energy storage; and wherein the DC energy storage is optionally charged from the AC input through a AC-to-DC charger.

FIG. 6 illustrates, according to one embodiment of the present invention, a system 600, comprising an electronic equipment 610, a switch 620, a controller 670, an AC supply 630, a DC energy storage component 650 supplied by an optional AC-DC charger 640, and an optional DC-DC converter 660 that is supplied by the DC storage component. The electronic equipment has a power supply rectifier that feeds DC internally. A terminal, 612, of the equipment, 610, is connected to a switch, 620, which connects terminal 612 either to terminal 632 of the AC supply or to terminal 662 at the DC-DC converter output. A second terminal, 614, of the equipment, 610, is tied directly to a terminal 634 of the AC supply as well as to a terminal 664 of the DC-DC converter output. The DC-DC converter converts the voltage level from DC storage 650 to a level that is suitable for feeding the electronic equipment 610. In addition, the DC-DC converter can provide galvanic isolation and protection for the DC input in case of short circuits or faults in equipment 610. The DC storage 650 can feed the terminals 662 and 664 directly if the aforementioned functions of the DC-DC converter are not needed. The controller, 670, senses the AC and DC inputs and controls the switch, e.g. connecting the equipment to the DC-DC converter if the AC input voltage is low. In addition, controller 670 optionally activates or deactivates the DC-DC converter, 660, e.g. to reduce idling power losses by turning it off when switch 620 is connected to the AC input. As another application example, the controller connects the switch to the DC feed 662 if it is preferable to avoid power draw from the AC supply, for example, in case the utility AC system has a very high load and requires relief.

Figure 7:
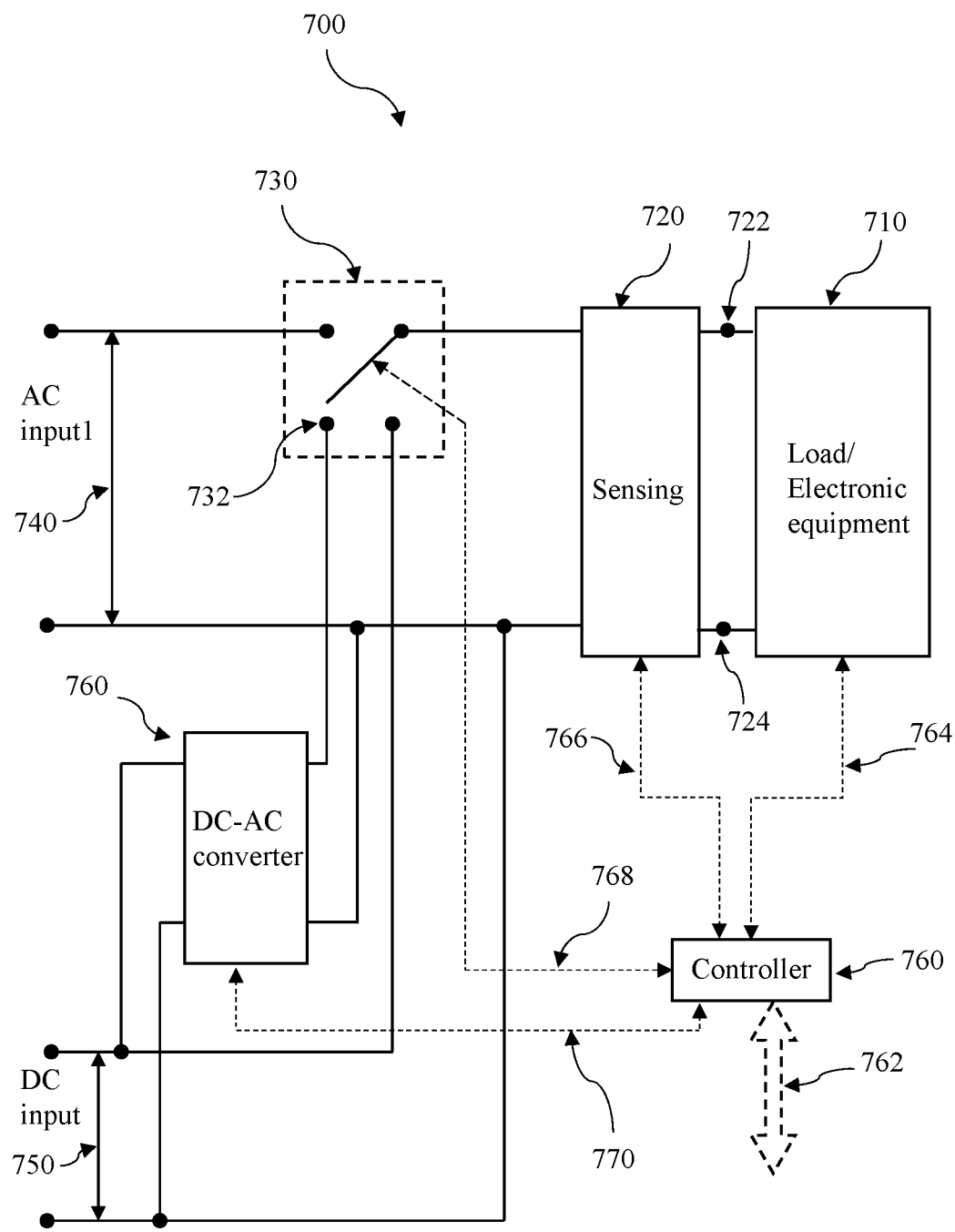
FIG. 7 illustrates a system to provide power to an electronic equipment according to one embodiment of the present invention; wherein a triple-throw switch connects an input terminal of the electronic equipment selectively to a first AC input voltage or to a DC voltage or to a second AC voltage that is generated by a DC-AC converter from the aforementioned DC voltage.

FIG. 7 illustrates a system 700, comprising a load or electronic equipment 710, a sensing block, 720, that senses variables such as voltage and current at the input of equipment, 710, a three-pole switch, 730, that selectively connects the input terminal, 722, of the load or equipment, 710, to a first AC input, 740, or to a DC input, 750, or to a second AC input, 732, that is generated from a DC-AC converter, 760, fed by the DC input, 750. A controller, 760, in conjunction with the sensing block, 720, controls the switch position. As an example, if the first AC input, 740, is sensed as being absent or out of a usable range, the switch position is moved to connect the load, 710, to the DC input, 750. As a continuation of this example, if the sensing block determines that the load is not compatible with a DC input through detection of an overcurrent or undervoltage or waveform abnormality at the input of the load, 710, after the aforementioned switchover, the controller moves the switch position such that the load, 710, is fed from the DC-AC converter, 760. The neutral terminal, 724, of the load can be directly connected to the three inputs as illustrated or connected through a three-position switch to further provide isolation between the three inputs. The controller provides commands and collects feedback from load, 710, sensing block, 720, switch, 730, DC-AC converter, 760, through communication channels 764, 766, 768 and 770 respectively. In addition, it optionally communicates with an external interface through communication channel 762. The controller, 760, can deactivate the DC-AC converter, 760, to improve system efficiency when the load, 710, is supplied from the first AC input, 740.

Figure 8:
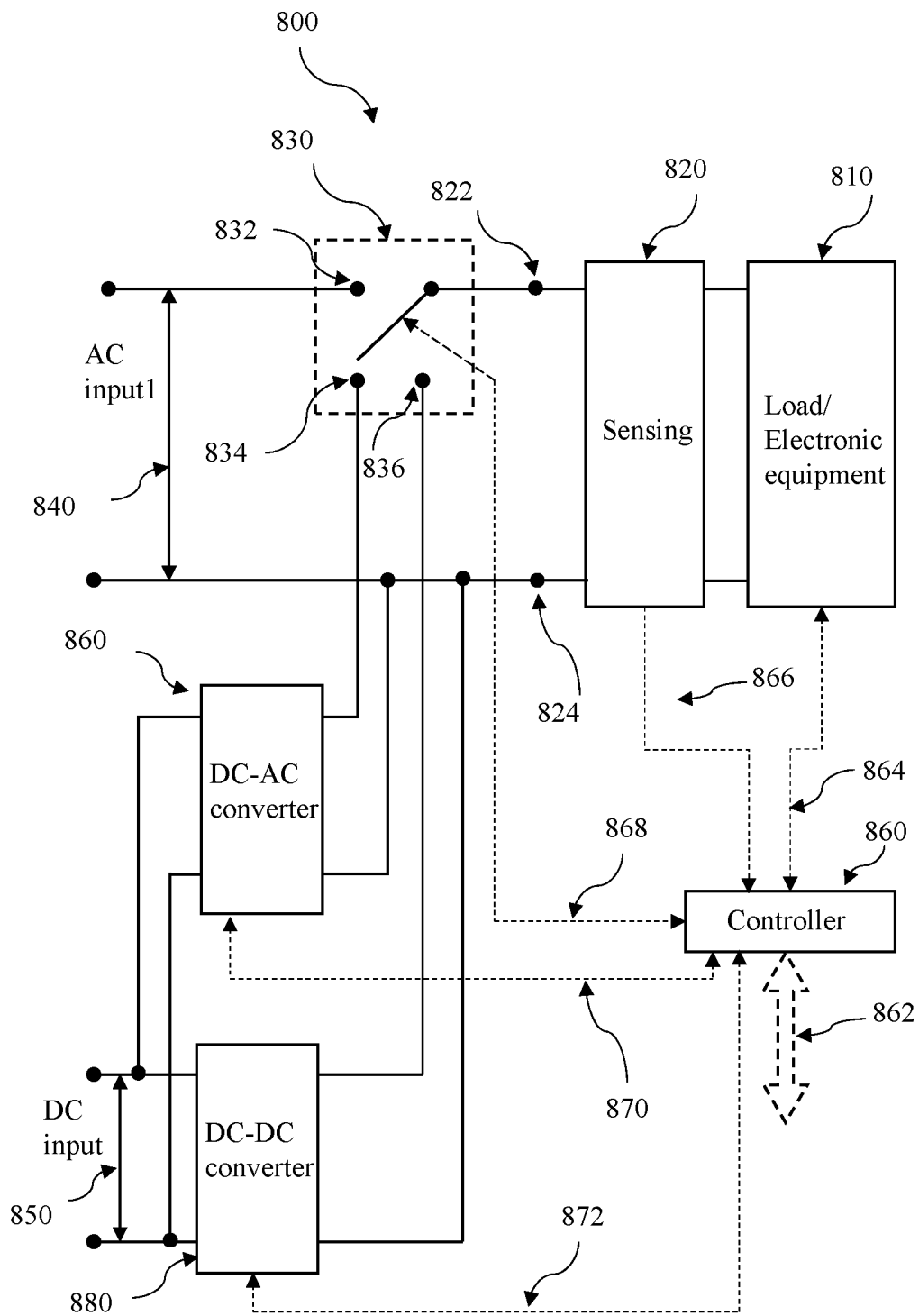
FIG. 8 illustrates a system to provide power to an electronic equipment according to one embodiment of the present invention; wherein a triple-throw switch connects an input terminal of the electronic equipment selectively to a first AC input voltage or to a DC voltage or to a second AC voltage wherein the DC voltage and the second AC voltage are generated by a DC-DC converter and a DC-AC converter respectively from a DC input.

FIG. 8 illustrates a system 800, comprising a load or electronic equipment 810, a sensing block, 820, that senses variables such as voltage and current at the input of equipment, 810, and a three-pole switch, 830, at the terminal, 822, that feeds the load or equipment, 810. The three-pole switch, 830, selectively connects the load input terminal, 822, to three positions; the first of which, 832, is connected to a first AC input, 840; the second of which, 834, is connected to a DC-AC converter, 860, fed from a DC input, 850; and the third of which, 836, is connected to a DC-DC converter, 880, fed from the DC input, 850. The neutral terminal, 824, of the load can be directly connected to the three inputs as illustrated or connected through a three-position switch to further provide isolation between the three inputs. The system further comprises a controller, 860, which communicates with the load, 810, the sensing block, 820, the switch, 830, the DC-AC converter, 860, and the DC-DC converter, 880, through the respective channels, 864, 866, 868, 870, and 872. For instance, when an absence of proper input at the first AC terminal, 832, is sensed, the controller changes the position of switch, 830, such that the load is fed from the DC input through the DC-DC converter. As a continuation of this example, if the controller further determines that the load is not compatible with DC fed from position 836 through the detection of overcurrent of other electrical abnormality, the controller can move the switch the position, 834, such that the load is fed through DC-AC converter, 860. The controller can further activate or deactivate converters 860, and 880 to reduce operating or standby power losses and improve system efficiency. In addition, the converter can communicate with an external interface through channel 862. The DC-DC converter, 880, and DC-AC converter, 860, are used to step-up, step-down or process the DC input, 850, and convert it to a level suitable for the load 810.

Figure 9:
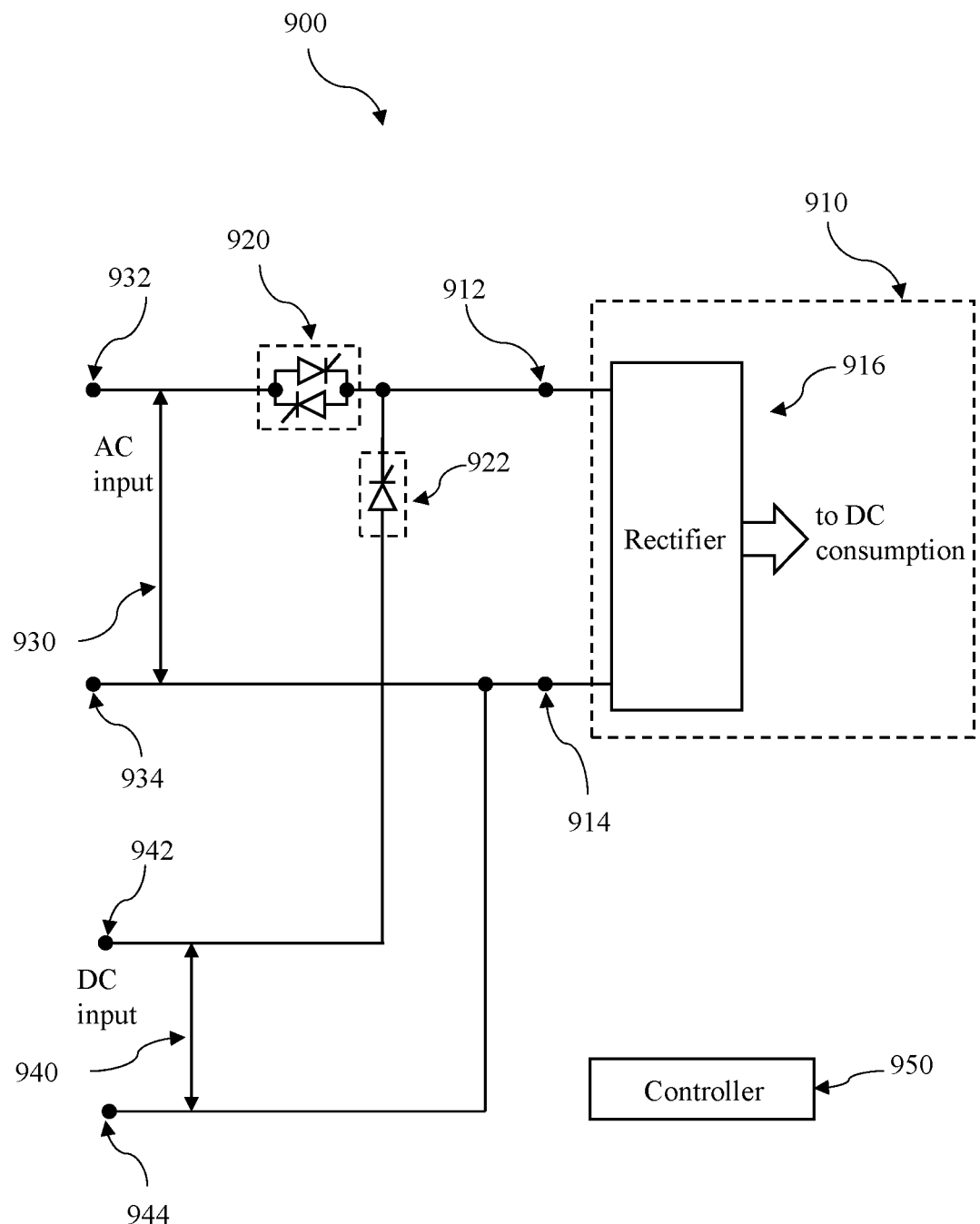
FIG. 9 illustrates a system to provide power to an electronic equipment with a rectifier stage in its power supply section; wherein semiconductor switches directly connect the equipment to an AC input or DC input to feed AC or DC power to the equipment, according to one embodiment of the present invention.

FIG. 9 illustrates a system 900, comprising an electronic equipment 910, a set of semiconductor switches, 920 and 922, an AC supply 930, and a DC supply 940, according to one embodiment of the present invention. The electronic equipment has a power supply rectifier, 916, that feeds DC to the loads within the equipment 910. Terminal 914 of the equipment, 910, is directly connected to terminal 934 of the AC input, 930 and terminal 944 of the DC input, 940. Terminal 934 can, for example, be the neutral of the AC input and terminal 944 can, for example, be the negative of the DC input. A second terminal, 912, of the equipment, 910, is connected to semiconductor switches, 920, and 922, which connect terminal 912 either to terminal 932 of the AC supply or to terminal 942 of the DC supply. An optional controller, 950, senses, for example, the source voltages and controls the semiconductor switches to an appropriate state, for example, connecting the equipment to the DC supply if the AC supply voltage falls below a threshold level. Silicon controlled rectifiers have been shown in the illustration, however other semiconductor switches such as transistors can be used instead.

Figure 10:
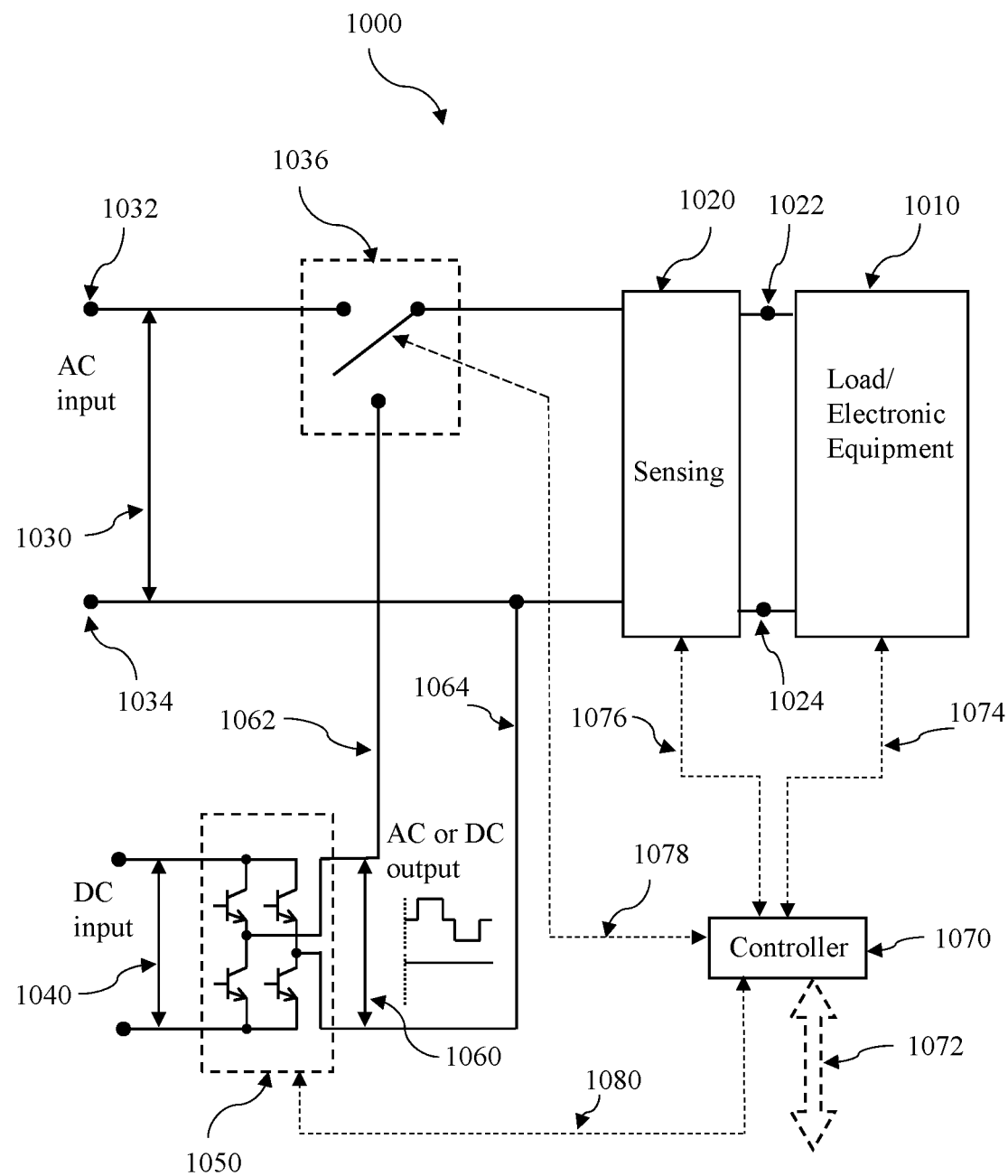
FIG. 10 illustrates a system to provide power to an electronic equipment wherein the equipment is connected through a switch to be fed by an AC input or from the output of a DC-fed converter which can provide either AC or DC, according to one embodiment of the present invention.

FIG. 10 illustrates, according to one embodiment of the present invention, a system 1000, comprising an electronic equipment 1010, a switch 1036, an AC supply 1030, a DC supply 1040 and a converter, 1050, which converts the DC input 1040 to either an AC or a DC output 1060. The electronic equipment, 1010, has a rectifier stage in its power supply that feeds DC to its components. The switch, 1036, selectively connects an input terminal, 1022, of the equipment, 1010, to a terminal, 1032, of the AC supply or to a terminal, 1062, at the output of the converter 1050. A second terminal, 1024 of the equipment, 1010, is directly connected to a terminal 1034 of the AC input, 1030 and a terminal 1064 of the converter output, 1060. A controller, 1070, in conjunction with sensing means 1020 senses the AC and DC inputs and the load current and controls the switch, for instance, connecting the equipment 1010 to the converter 1050 if the AC input voltage 1030 is absent or too low for proper functioning of equipment 1010. As a continuation of this embodiment, the converter 1050 when connected to the load can, for instance, initially feed the load with DC by turning on a diagonal set of transistors continuously in the converter 1050. Subsequently if the controller determines that the load 1010 is not properly functional when fed with DC from the converter 1050, for example through the detection of overcurrent, the controller can control the converter 1050 to output an AC waveform for feeding the load. This can, for example, happen in case the load has components such as fans and transformers that may require AC to operate and may saturate and not function properly if fed with DC. If the load is operable with either AC or DC, operating the converter 1050 in a manner to provide DC output by keeping a set of diagonal transistors in converter 1050 on can result in improved efficiency of the converter in comparison with operating the converter in an AC output mode by switching the transistors alternately.

The foregoing description of exemplary embodiments of the invention has been presented for the purposes of illustration and description. It is not intended to be exhaustive or to limit the invention to the precise forms disclosed. It will be recognized by those skilled in the art that many modifications and variations are possible without departing from the essential scope of the invention. It is, therefore, to be understood that the scope of the invention is not limited to the particular embodiments disclosed, and that the invention will include all embodiments falling within the scope of the claims appended hereto.

What is claimed is:

1. A system comprising:
   an electronic equipment comprising a first and a second input terminal;
   an AC source for supplying power to the electronic equipment wherein the AC source comprises a first terminal and a second terminal;
   a DC source for supplying power to the electronic equipment wherein the DC source comprises a first terminal and a second terminal;
   a switch; and
   a controller;
   wherein the second input terminal of the electronic equipment is connected to the second terminal of the AC source and the second terminal of the DC source; and
   wherein the controller senses the level of the AC source and determines when the level of the AC source is sufficient for supplying power to the electronic equipment; and
   wherein the controller senses the level of the DC source and determines when the level of the DC source is sufficient for supplying power to the electronic equipment; and
   wherein the controller in response to the sensing of the levels of the AC source and the DC source controls the switch such that the first input terminal of the electronic equipment is connected either to the first terminal of the AC source or to the first terminal of the DC source through the switch; and
   wherein the controller controls the switch such that the first input terminal of the electronic equipment is connected to the first terminal of the DC source when the DC source is sensed to be of sufficient level for supplying the electronic equipment even when the AC source is sensed to be of sufficient level for supplying the electronic equipment.

2. The system of claim 1, wherein the switch is a multiple-throw switch.

3. The system of claim 1, wherein the DC source further comprises a DC energy storage component.

4. The system of claim 1, wherein the DC source further comprises a DC-DC converter.

5. The system of claim 1 wherein the switch comprises an electromechanical relay.

6. The system of claim 1 wherein the switch comprises a power semiconductor device.

\* \* \* \* \*